US 6,601,695 B1

(12) United States Patent
Rosenstrom

(10) Patent No.: US 6,601,695 B1
(45) Date of Patent: Aug. 5, 2003

(54) DIFFERENTIAL MOTION CONVEYOR DRIVE

(75) Inventor: Bo Richard Rosenstrom, Elizabethtown, KY (US)

(73) Assignee: Carrier Vibrating Equipment, Inc., Louisville, KY (US)

( * ) Notice: Subject to any disclaimer, the term of this patent is extended or adjusted under 35 U.S.C. 154(b) by 32 days.

(21) Appl. No.: 10/040,218

(22) Filed: Jan. 2, 2002

(51) Int. Cl.[7] ............................................. B65G 25/00
(52) U.S. Cl. ................................... 198/750.1; 198/770
(58) Field of Search ........................ 198/750.1, 750.8, 198/770

(56) References Cited

U.S. PATENT DOCUMENTS

| 3,703,236 A | 11/1972 | Spurlin et al. |
| 4,111,061 A | 9/1978 | Thomas |
| 4,149,627 A | 4/1979 | Dumbaugh et al. |
| 4,168,774 A | 9/1979 | Musschoot |
| 4,176,983 A | 12/1979 | Gardner |
| 4,267,919 A * | 5/1981 | Schrader ..................... 198/770 |
| 4,272,366 A | 6/1981 | Dean et al. |
| 5,064,053 A | 11/1991 | Baker |
| 5,131,525 A | 7/1992 | Musschoot |
| 5,392,898 A | 2/1995 | Burgess et al. |
| 5,409,101 A | 4/1995 | Ahmed et al. |
| 5,584,375 A * | 12/1996 | Burgess et al. .............. 198/770 |
| 5,615,763 A | 4/1997 | Schieber |
| 5,762,176 A | 6/1998 | Patterson et al. |
| 5,934,446 A | 8/1999 | Thomson |
| 5,938,001 A | 8/1999 | Turcheck, Jr. et al. |
| 6,024,210 A | 2/2000 | Rosenstrom |
| 6,041,915 A | 3/2000 | Fishman et al. |
| 6,079,550 A | 6/2000 | Gilman |
| 6,145,652 A | 11/2000 | Durnil |
| 6,155,404 A | 12/2000 | Musschoot |
| 6,202,832 B1 | 3/2001 | Evansic |
| 6,269,940 B1 * | 8/2001 | Rosenstrom ............. 198/750.8 |
| 6,276,518 B1 * | 8/2001 | Wierman .................... 198/770 |
| 6,457,577 B1 * | 10/2002 | Ikeda et al. .............. 198/750.1 |

FOREIGN PATENT DOCUMENTS

| EP | 0 796 213 B1 | 4/2000 |
| EP | 1 007 451 A1 | 6/2000 |

* cited by examiner

Primary Examiner—Joseph E. Valenza
(74) Attorney, Agent, or Firm—Stites & Harrison, PLLC; David W. Nagle, Jr.

(57) ABSTRACT

A differential motion conveyor drive includes at least three pairs of drive shafts carrying eccentric weights that are selected to correspond to the terms of a Fourier series in order to achieve optimal conveying speed and efficiency. To approximate the Fourier series terms, in one preferred embodiment, each of the first pair of shafts carries a weight and rotates at a predetermined operating speed $\omega$. Each of the second pair of shafts carries a smaller weight and rotates at an operating speed $2\omega$, and each of the third pair of shafts carries an even smaller weight and rotates at an operating speed $3\omega$. An appropriate weight distribution results in a differential motion conveyor drive that consistently produces a higher conveying speed compared to that produced by a prior art drive throughout a range of operating speeds.

18 Claims, 18 Drawing Sheets

$3\omega$  $2\omega$  $\omega$ $3\omega$  $2\omega$  $\omega$

DIFFERENTIAL MOTION CONVEYOR DRIVE

BACKGROUND OF THE INVENTION

The present invention relates to vibratory conveying equipment for moving bulk material, and, more particularly, to a differential motion conveyor drive.

Vibratory conveyors are well known is the art and are commonly used for moving bulk materials. There are two primary types of vibratory conveyors. In a first type, a force is imparted to the material-carrying trough at an angle relative to horizontal plane defined by the trough so that the material moves with the trough along this angle. Once the force is reversed, the trough moves in the reverse direction, allowing the material to fall to the trough in a more forward position. Typically, an eccentric shaft drive system imparts the requisite force to the trough, which is mounted to a stationary support through a plurality of elastic members such as springs. The eccentric shaft drive system comprises one or more rotating shafts and associated drive springs so as to impart the cyclically acting resultant force to the vibratory trough. In simple terms, the conveyed material is essentially "bounced" along the trough from an inlet end to a discharge end. Thus, through much of its travel, the conveyed material is airborne, and the material actually contacts the trough only long enough to be re-launched into the air in the direction of the discharge end of the trough.

For various reasons, it may not be desirable to use the aforementioned vibratory conveyor as the "bouncing" action is not without its disadvantages. Quite obviously, the movement of the conveyor trough in both horizontal and vertical directions makes it extremely difficult for a worker stationed along the conveyor trough to perform any work on the conveyed material. Furthermore, the vertical motion of the conveyor trough may cause light particulates to be launched into the air, creating an extremely dusty and potentially hazardous working environment. Finally, the repeated impact of the material against the conveyor trough as it launches and catches the material creates a noisy working environment, and the repeated impact can also cause damage to the conveyor trough and the product conveyed over time.

One solution to this problem has been the development of a second type of vibratory conveyor in which the conveying action is achieved through the application of a purely horizontal force to the conveyor trough, with the supports for the trough permitting movement of the trough primarily horizontally. In other words, any vertical movement of the trough is minimal.

In such a vibratory conveyor, commonly referred to as a "slow advance, fast return," "differential motion" or "horizontal motion" conveyor, the drive or vibration-generating means is arranged such that the maximum horizontal vibratory forces applied to the trough in the direction of conveyance are less than the static friction force acting between the trough and the conveyed material. As such, adherence is maintained between the conveyed material and the trough, and the material is conveyed forward; however, the horizontal force applied to the trough opposite to the direction of conveyance is such that the static frictional force is exceeded, and the trough recoils without returning the material to its original position. In other words, the conveyor trough moves forward relatively slowly, keeping acceleration down so the conveyed material will not slip, but the conveyor trough moves backward and returns at a much higher speed and acceleration, overcoming frictional forces in that the material slides relative to the conveyor trough. As such, a "slow advance, fast return" or "shuffling" motion is achieved.

U.S. Pat. No. 5,131,525 ("the '525 Patent), which is assigned to the General Kinematics Cooperation of Barrington, Ill., describes such an exemplary differential motion conveyor. For this teaching, the '525 Patent is incorporated herein by this reference. Furthermore, as recognized in the '525 Patent, the differential motion conveyor can be used to convey powdery or dusty materials without creating an extremely dusty and potentially hazardous working environment, and also allows for the visual and/or manual inspection and treatment of materials by workers positioned along side the conveyor trough. As stated in the '525 Patent, other potential advantages of a differential motion conveyor include: the ability to position the drive or vibration-generating means anywhere along the conveyor trough; and the ability to secure the drive or vibration-generating means directly to the trough as the forces generated by the drive are absorbed by the reactive motion of the trough, thereby reducing the reaction forces which must otherwise be absorbed.

For further information about prior art differential motion conveyors and the development of such conveyors, reference is also made to U.S. Pat. No. 5,850,906 ("the '906 Patent), which is assigned to FMC Corporation of Chicago, Ill. The '906 Patent is incorporated herein by this reference.

In any event, most prior art differential motion conveyors employ rotating weight, brute-force drives that include four drive shafts. The relative position of the drive shafts is held constant through the use of gears or gear belts. Referring now to FIGS. 2A–2D, two of the drive shafts 10A, 10B function as a pair, carrying equivalent eccentric weights 12A, 12B and counter-rotating in the directions indicated by arrows 14A and 14B at a chosen operating speed. The two remaining drive shafts 20A, 20B similarly function as a pair, carrying equivalent eccentric weights 22A, 22B (larger than those carried by the first pair of drive shafts) and also counter-rotating in the directions indicated by arrows 24A and 24B, but at an operating speed half that of the first pair of drive shafts 10A, 10B. Thus, the rotating forces represented by the eccentric weights are always additive in the plane of the conveyor trough (i.e., horizontal), but always cancel in any other direction relative to the plane of the conveyor trough (i.e., vertical).

FIG. 3A depicts the net acceleration output from such a four-shaft prior art drive as a function of time. Specifically, the net acceleration from the drive is the sum of two sinusoidal accelerations of different amplitude and frequency. As indicated in FIG. 3A, at t=0 s, when the position of the eccentric weights is that depicted in FIG. 2A, a substantial negative acceleration is generated by the conveyor drive, imparting a force on the conveyor trough that results in the "fast return," the backward movement of the conveyor trough that overcomes the frictional forces between the conveyed material and the conveyor trough.

As the eccentric weights rotate into the position depicted in FIG. 2B (t=0.043 s), a positive acceleration and resultant force (albeit with a magnitude less than that of the negative "fast return" force) is generated to convey the material forward in the conveyor trough. This positive acceleration and force, and the resulting forward movement, continues as the eccentric weights rotate into the positions depicted in FIGS. 2C (t=0.086 s) and 2D (t=0. 129 s).

Finally, as the eccentric weights return to the position depicted in FIG. 2A, another rapid backward movement is generated, again overcoming the frictional forces between the conveyed material and the conveyor trough.

As should be clear from a review of FIG. 3A, to maximize the net conveying speed, it is desirable to minimize the time interval in which a negative acceleration and resultant force is generated and acts on the conveyor trough. At the same time, it is desirable to maximize the time interval in which a positive acceleration and resultant force is generated, an interval generally bounded by the positions of the eccentric weights depicted in FIGS. 2B and 2D.

FIG. 3B depicts the velocity of the of the conveying motion as a function of time. As shown, the velocity oscillates over time between a minimum at approximately the position of the eccentric weights as depicted in FIG. 2B to a maximum at approximately the position of the eccentric weights as depicted in FIG. 2D. As will be described in further detail in the description of the present invention, the ideal velocity profile would indicate a constant positive acceleration (i.e., forward movement) with a virtually instantaneous negative acceleration (i.e., backward movement).

Finally, FIG. 3C depicts the motion (i.e., displacement) of the conveyor trough as a function of time.

Prior art differential motion conveyors employing rotating weight, brute-force drives with four drive shafts have been demonstrated to operate well up to conveying speeds of 30–40 feet per minute (fpm). The limiting factor, however, for such a differential motion conveyor is the maximum G-differential that can be obtained using the four-shaft arrangement. The G-differential is the ratio between the G-loads at the two extremes of the operating stroke (i.e., one complete rotation of the first pair of drive shafts), i.e., the ratio of the minimum acceleration to the maximum acceleration imparted to the conveyor trough:

$$G\text{-differential} = -\frac{\min(G_{LOAD})}{\max(G_{LOAD})} = -\frac{\min(\text{acceleration})}{\max(\text{acceleration})} \quad (1)$$

For a four-shaft drive, the theoretical maximum G-differential is 2.0.

It is therefore a paramount object of the present invention to provide a differential motion conveyor drive that allows for higher conveying speeds, speeds that are not possible due to the limitations inherent in the prior art.

This and other objects and advantages of the present invention will become apparent upon a review of the following description and appended claims.

SUMMARY OF INVENTION

The present invention is a differential motion conveyor drive employing at least three pairs of drive shafts carrying eccentric weights that are selected to correspond to the terms of a Fourier series in order to achieve optimal conveying speed and efficiency. To approximate the Fourier series terms, in one preferred embodiment, each of the first pair of shafts carries a weight WR and rotates at a predetermined operating speed ω. Each of the second pair of shafts carries a weight (0.50)WR and rotates at an operating speed 2ω, and each of the third pair of shafts carries a weight (0.33)WR and rotates at an operating speed 3ω. Since a Fourier series contains an infinite number of sinusoidal terms, however, the actual weight distribution on the drive shaft pairs may be further adjusted to account for the "missing" terms of the Fourier series. An appropriate weight distribution results in a differential motion conveyor drive that consistently produces a higher conveying speed compared to that produced by a prior art drive throughout a range of operating speeds.

DETAILED DESCRIPTION OF THE PRESENT INVENTION

The present invention is a differential motion conveyor drive employing at least six drive shafts carrying eccentric weights that are preferably selected to correspond to the terms of a Fourier series in order to achieve optimal conveying efficiency.

Figure 1:
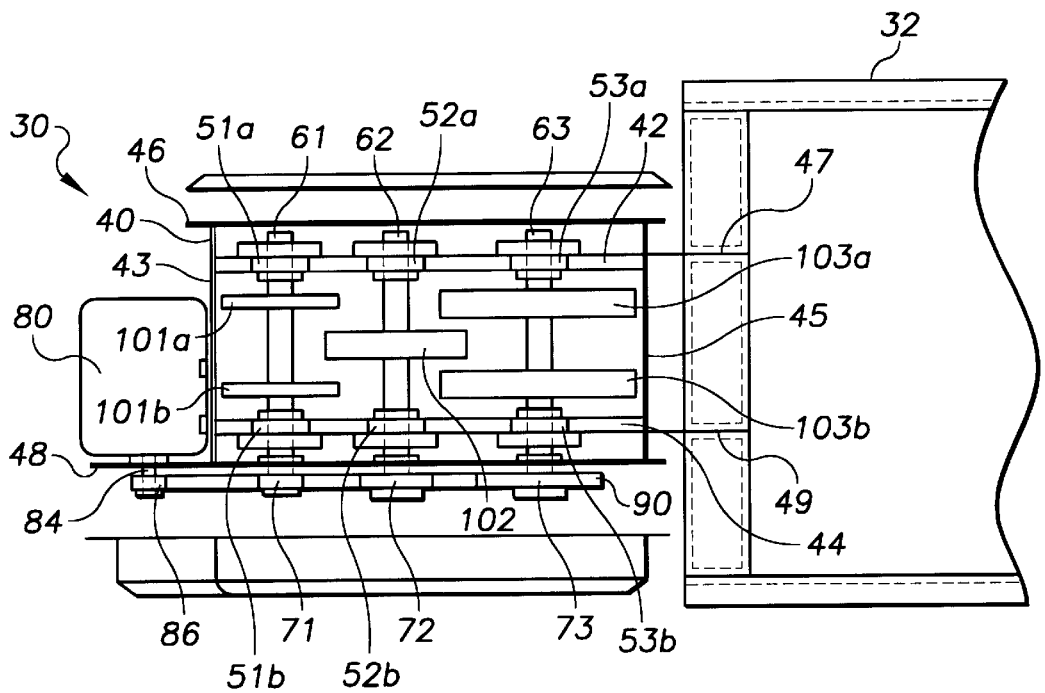
FIG. 1 is a top view of a preferred differential motion conveyor drive in accordance with the present invention as secured to an end of a conveyor trough.
Figure 1A:
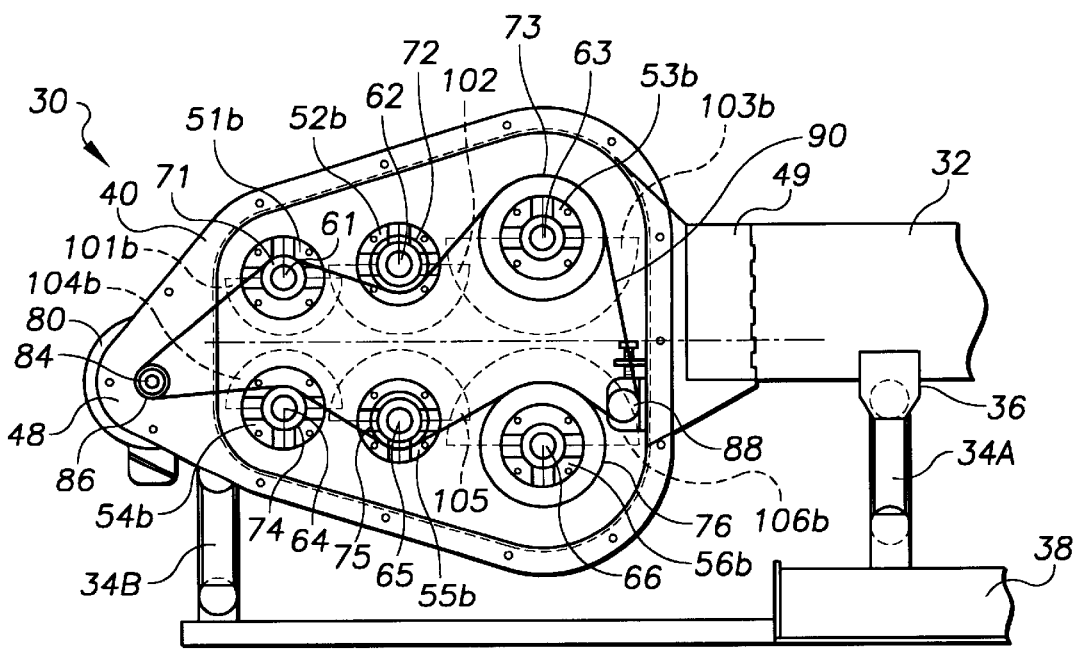
FIG. 1A is a side view of the preferred differential motion conveyor drive of FIG. 1.
Figure 2A:
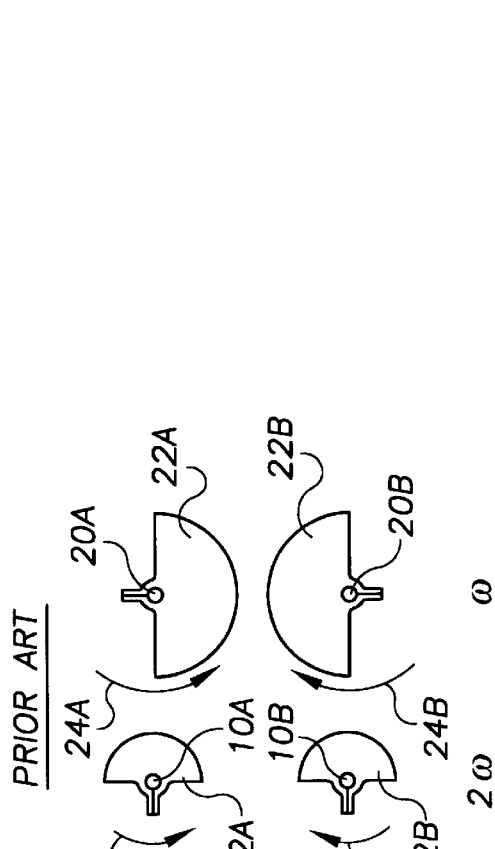
FIGS. 2A–2D depict the relative positions of the eccentric weights mounted to the four drive shafts of a prior art differential motion conveyor drive through one conveying cycle.
Figure 2B:
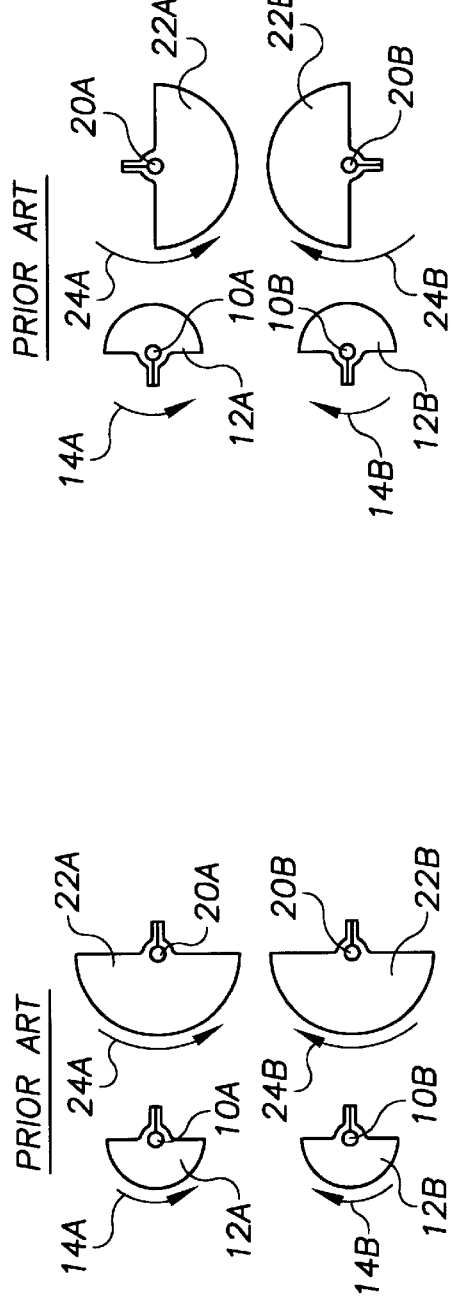
Figure 2C:
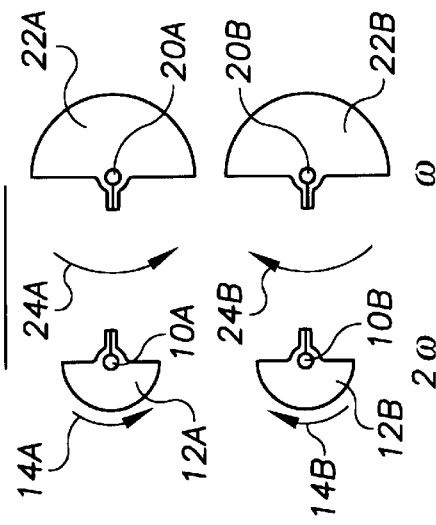
Figure 2D:
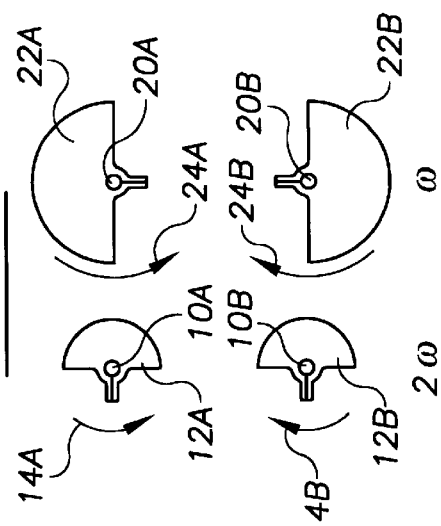

FIGS. 1 and 1A depict a preferred differential motion conveyor drive 30 in accordance with the present invention as secured to an end of a conveyor trough 32. Although only a portion of the conveyor trough 32 is shown in the Figures, the construction of such a conveyor trough 32 is well known in the art. Generally, a conveyor trough 32 is an elongated member which receives material to be conveyed from a delivery conveyor (not shown) at a first or inlet end, and then conveys that material to a second or discharge end where the material is discharged to other processing equipment. Of course, the conveyor trough 32 may be open or closed, and of varying size and dimensions, such factors being largely dependent on the particular material being conveyed.

The trough 32 is supported by a plurality of rocker arms, although various other support or suspension means (e.g., leaf springs, rods or cables) could be used without departing from the spirit and scope of the present invention. In the preferred embodiment of FIGS. 1 and 1A, the trough 32 is supported along its length by a series of rocker arms (two of which are indicated by reference numerals 34A and 34B) mounted in a vertical position between a mounting bracket 36 near the bottom surface of the conveyor trough 32 and a stationary base 38. Rocker arm supports are well known in the art and are commonly made from steel, aluminum, or a similar material.

In the preferred embodiment of the differential motion conveyor drive 30 of the present invention depicted in FIGS. 1 and 1A, the drive 30 is secured to the inlet end of the conveyor trough 32. Of course, since the differential motion conveyor drive 30 imparts only a horizontal force to the conveyor trough 32, the drive 30 could be secured to the conveyor trough 32 at any position along the length of the conveyor trough 32.

The differential motion conveyor drive 30 includes a frame 40. The frame 40 generally includes a pair of parallel inner side support walls 42, 44 and a pair of parallel outer side walls 46, 48 separated by first and second spacing members 43, 45. In this preferred embodiment, the frame 40 of the conveyor drive 30 also includes two connecting members 47, 49 that are secured to and extend from the respective support walls 42, 44 of the conveyor drive 30 to facilitate attachment of the conveyor drive 30 to the conveyor trough 32.

Mounted within the frame 40 of the conveyor drive 30 are a plurality of drive shafts. In this preferred embodiment, six drive shafts 61, 62, 63, 64, 65, 66 are interposed between and rotatably mounted to the inner support walls 42, 44 and supported by respective bearings 51a, 52a, 53a, 54a, 55a, 56a, 51b, 52b, 53b, 54b, 55b, 56b (e.g., ball bearings or six drive shafts 61, 62, 63, 64, 65 66 are arranged in three pairs and are mounted in parallel relationship with respect to one another. Each drive shaft also extends through a respective opening defined by the outer side wall 48 with a drive pulley 71, 72, 73, 74, 75, 76 secured to the distal end of each drive shaft, the importance of which is discussed below. As will become clearer in the description that follows, at least six drive shafts are required for the conveyor drive 30 to function as contemplated, but additional drive shafts could be added to the conveyor drive 30 without departing from the spirit and scope of the present invention.

As shown in FIGS. 1 and 1A, also secured to the frame 40, through bolts or similar well-known fasteners, is a motor 80. The motor 80 has a shaft 84 that, similar to the drive shafts described above, extends through the outer wall 48 of the frame 40. A drive pulley 86 is secured to the distal end of the shaft 84 of the motor 80 outside of the frame 40 of the conveyor drive 30. An idler pulley 88 is also secured to the outer surface of the support wall 42 of the frame 40 and lies the same plane as the drive pulley 86.

As best shown in FIG. 1A, a belt 90 extends around each drive pulley 71, 72, 73, 74, 75, 76 associated with the drive shafts, around the drive pulley 86 associated with the motor 80, and around the idler pulley 88. As such, when the motor 80 is energized, the rotation of its shaft 84 and associated drive pulley 86 results in the simultaneous rotation of each of the drive shafts 61, 62, 63, 64, 65, 66 interposed between and rotatably mounted to the inner support walls 42, 44 of the frame 40 of the conveyor drive 30. Furthermore, the routing of the belt 90 is in a preferred pattern, the importance of which is discussed below.

The particular mounting details described represent a preferred mounting of the drive shafts, bearings, motor, and various pulleys. Of course, various means of mounting the drive shafts, bearings, pulleys, and motor of a differential motion conveyor drive are known in the prior art and could be appropriately implemented for mounting the components of the present invention without departing from the spirit and scope of the present invention.

Also, as mentioned above, differential motion conveyor drives employing four drive shafts are well-known in the art. Through the use of at least six drive shafts appropriately fitted with eccentric weights in a manner to be described below (as shown in FIGS. 1 and 1A), the differential motion conveyor drive of the present invention allows for higher conveying speeds, speeds that are not possible due to the limitations inherent in the prior art.

Referring again to FIGS. 1 and 1A, each of the drive shafts 61, 62, 63, 64, 65, 66 carry eccentric weight elements. Specifically, shaft 61 carries two eccentric weight elements 101a, 101b, shaft 62 carries eccentric weight 102, and shaft 63 carries eccentric weight elements 103a, 103b. Similarly, shaft 64 carries two eccentric weight elements 104a (not shown), 104b, shaft 65 carries eccentric weight 105, and shaft 66 carries eccentric weight elements 106a (not shown), 106b. Although some shafts (e.g., shaft 61) carry a pair of eccentric weights, such positioning of the eccentric weights is for purposes of dynamically balancing the conveyor drive 30, but regardless of whether a single eccentric weight or a plurality of eccentric weight elements is mounted to any particular drive shaft, the horizontal force generated by the rotation of the shaft is a result of the acceleration of the aggregate weight.

FIGS. 4A–4D depict the relative positions of the eccentric weights mounted to the six drive shafts 61, 62, 63, 64, 65, 66 of the preferred differential motion conveyor drive 30 during the conveying cycle. Shafts 61 and 64 function as a pair carrying equivalent aggregate weight (generally indicated by reference numerals 101 and 104) and counter-rotating in the directions indicated by arrows 110A and 110B at a chosen operating speed. Similarly, shafts 62 and 65 function as a pair carrying equivalent aggregate weight (generally indicated by reference numerals 102 and 105) and counter-rotating in the directions indicated by arrows 112A and 112B at a chosen operating speed. Finally, shafts 63 and 66 function as a pair carrying equivalent aggregate weight (generally indicated by reference numerals 103 and 106) and counter-rotating in the directions indicated by arrows 114A and 114B at a chosen operating speed.

As mentioned, it is desirable to minimize the time interval in which a negative force is generated and acts on the conveyor trough while maximizing the time interval in which a positive force is generated. As such, an ideal velocity profile would indicate a constant positive acceleration (i.e., forward movement) with a virtually instantaneous negative acceleration (i.e., backward movement). The ideal velocity profile is shown by the "saw-tooth" contour depicted in FIG. 5B and indicated by reference numeral 120.

In reviewing this contour, applicant recognized that any periodic waveform could be represented as the sum of an infinite number of sinusoidal terms. Such a sum of terms is commonly referred to as a Fourier series. The ideal velocity profile is a periodic waveform and therefore can be represented as a Fourier series, specifically:

$$f(x) = \left( \frac{\sin x}{1} - \frac{\sin 2x}{2} + \frac{\sin 3x}{3} - \cdots \right) \quad (2)$$

Applicant then applied this mathematical principle to the practical objective of increasing the speed and efficiency of the differential motion conveyor, in accordance with the present invention, the rotational speeds of the drive shaft pairs and the eccentric weights mounted to the drive shaft pairs are selected so as to approximate the terms of the Fourier series.

Specifically, to approximate the Fourier series terms, and therefore the ideal velocity profile, the applicant assumed that each of the shafts 63 and 66 could carry a weight WR and rotate at a predetermined operating speed ω. Therefore, in one preferred embodiment, the applicant determined that shafts 62 and 65 should carry a weight (0.50)WR and rotate at an operating speed 2ω), and shafts 61 and 64 should carry a weight (0.33)WR and rotate at an operating speed 3ω). As such, the weight ratios equal the coefficients of the terms of the Fourier series in equation (1)—1.0, 0.50, 0.33.

As mentioned above, a Fourier series contains an infinite number of sinusoidal terms. Thus, to include all of the terms of the Fourier series would require an infinite number of shafts. The applicant recognized the impossibility of infinite shafts, but then recognized that the actual weight distribution on the drive shaft pairs may be further adjusted to account for the "missing" terms of the Fourier series. For example, through experimental study, the applicant determined that a preferred weight distribution would include each of the shafts 63 and 66 carrying a weight WR, each of the shafts 62 and 65 carrying a weight (0.18)WR, and each of shafts 61 and 64 carrying a weight (0.05)WR.

Figure 5A:
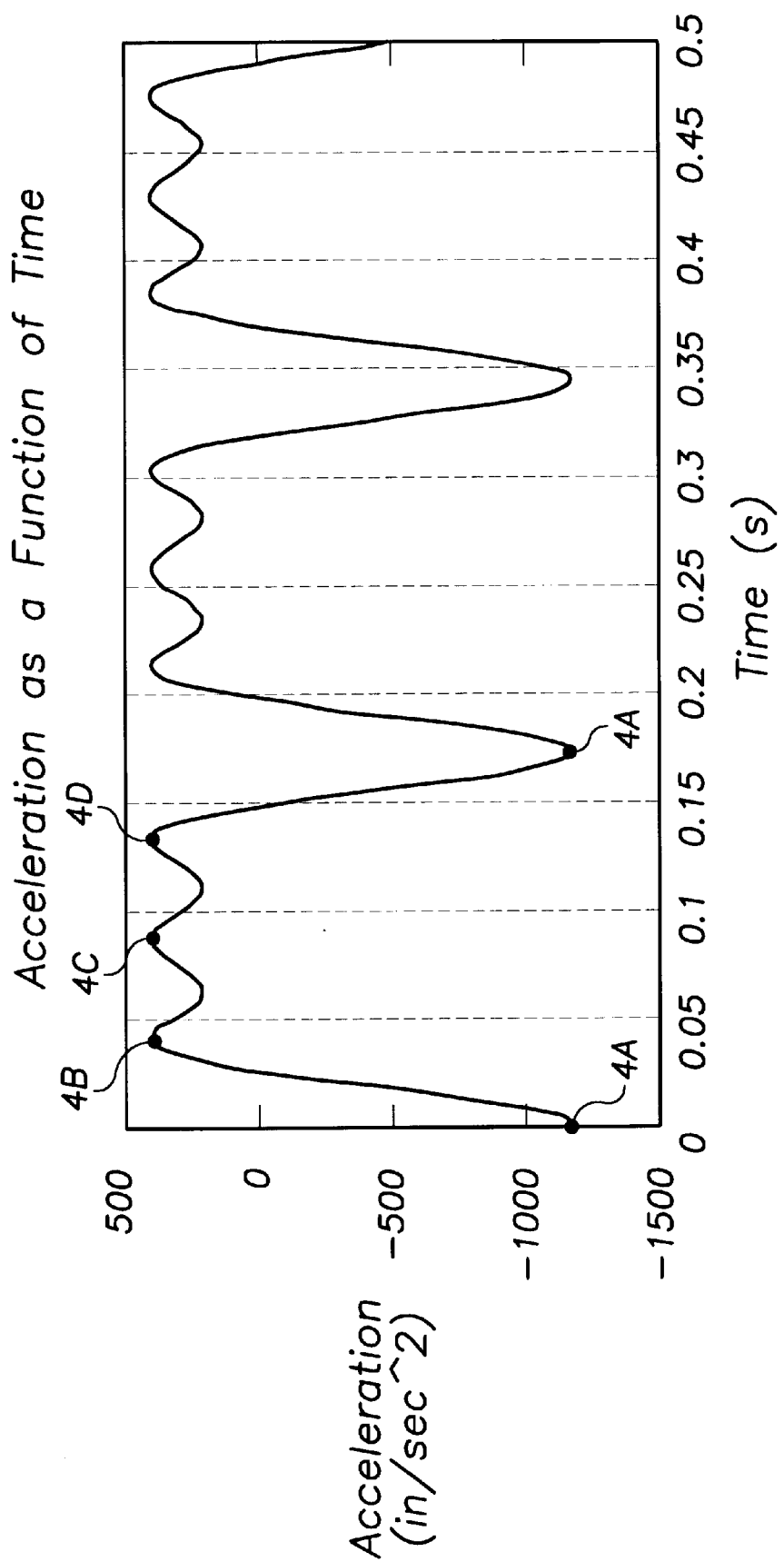
FIG. 5A is a graph representing the net acceleration from the six-shaft differential motion conveyor drive depicted in FIGS. 4A–4D.
Figure 5B:
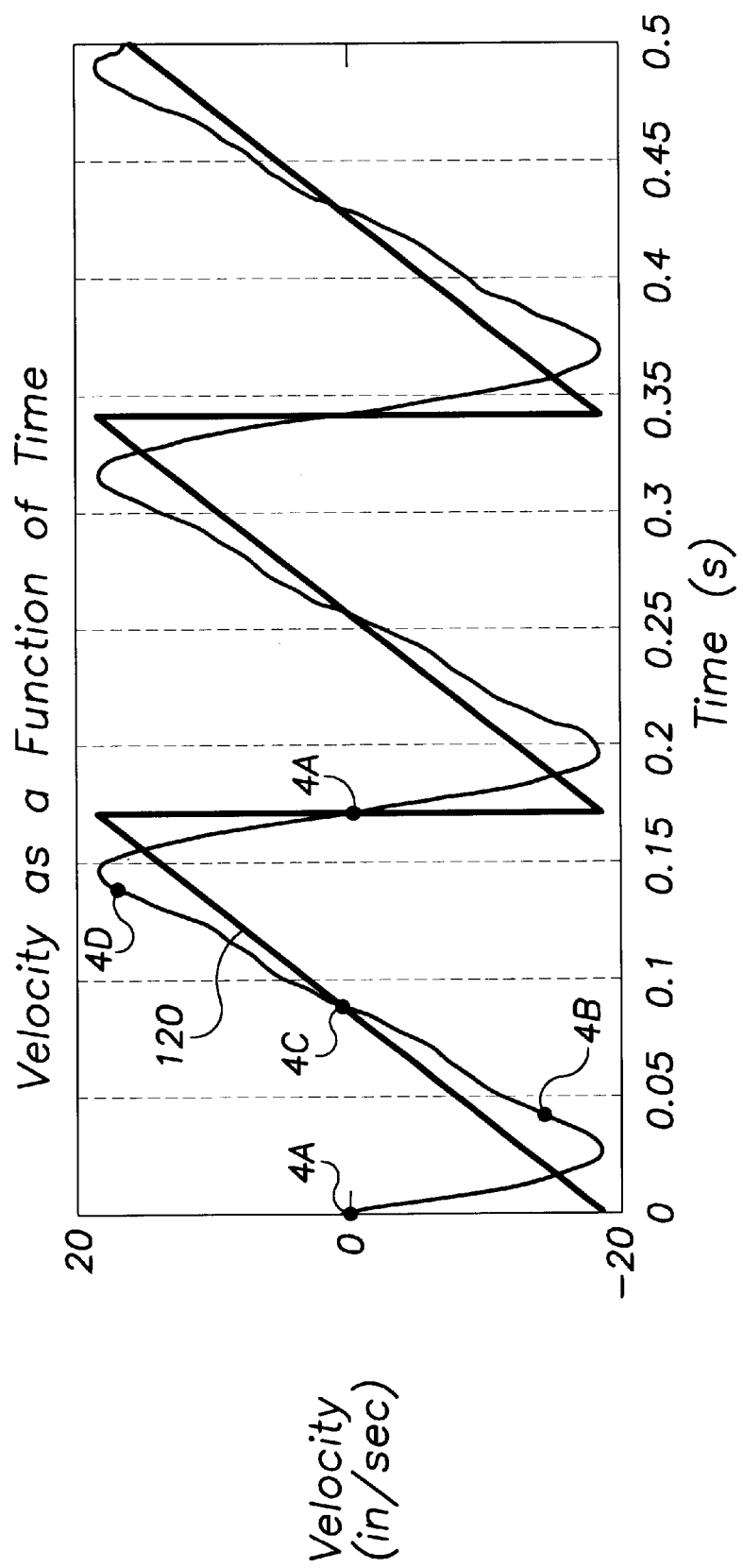
FIG. 5B is a graph representing the velocity of the of the conveying motion as a function of time for the six-shaft differential motion conveyor drive depicted in FIGS. 4A–4D.

FIG. 5A depicts the net acceleration output from such a six-shaft differential motion conveyor drive 30 as a function of time. Specifically, the net acceleration from the drive 30 is the sum of the three sinusoidal accelerations generated by the drive shaft pairs. At t=0 s, when the position of the eccentric weights is that depicted in FIG. 4A, a substantial negative acceleration is generated by the conveyor drive 30, imparting a force on the conveyor trough 32 that results in the "fast return," the backward movement of the conveyor trough 32 that overcomes the frictional forces between the conveyed material and the conveyor trough 32.

Figure 4A:
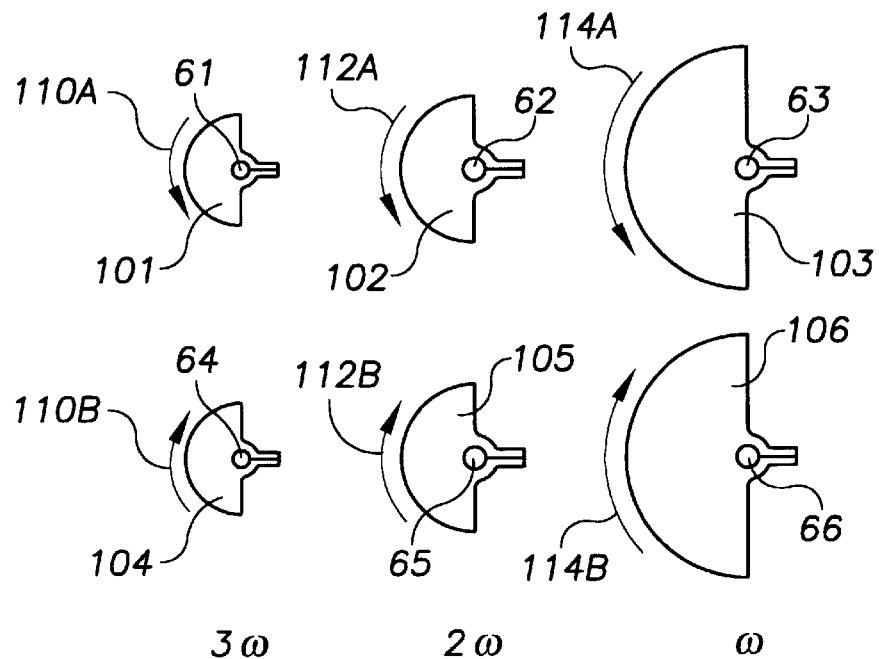
FIGS. 4A–4D depict the relative positions of the eccentric weights mounted to the six drive shafts of the preferred differential motion conveyor drive of FIG. 1 through one conveying cycle.
Figure 4B:
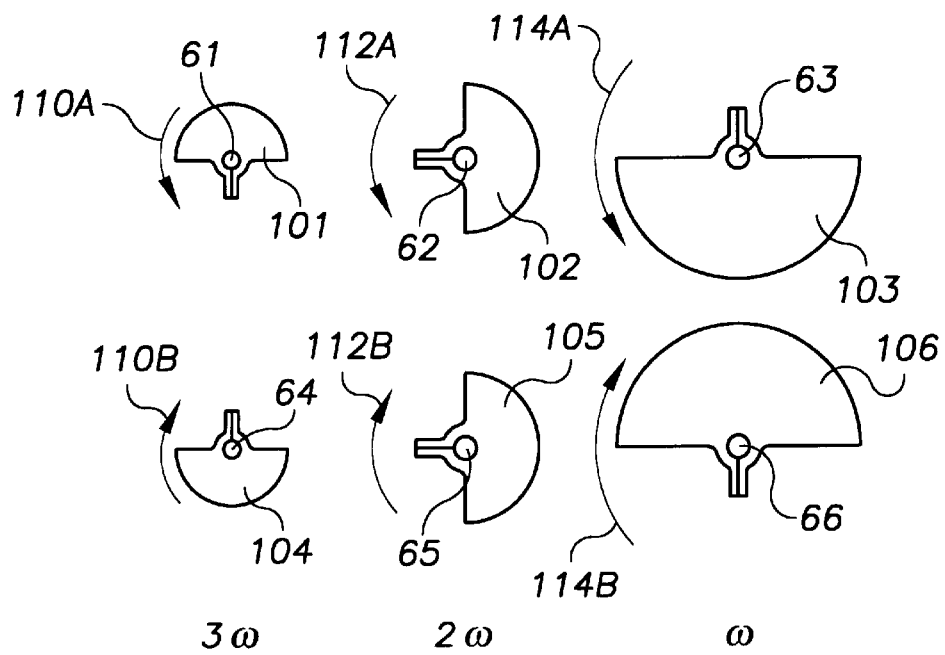
Figure 4C:
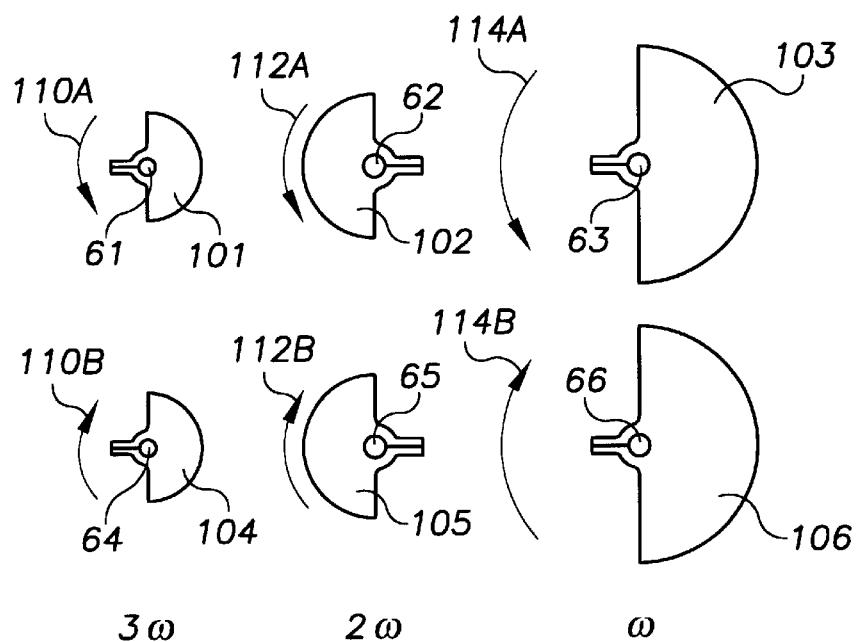
Figure 4D:
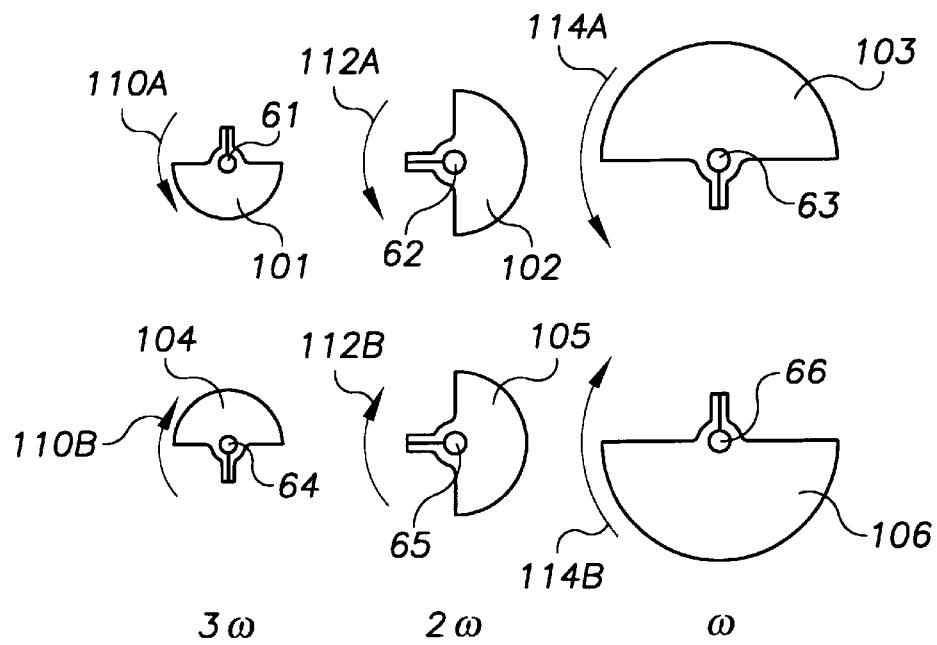

As the eccentric weights rotate into the position depicted in FIG. 4B (t=0.043 s), a positive acceleration and resultant force is generated to convey the material forward in the conveyor trough. This positive acceleration and resultant force, and the resulting forward movement, continues as the eccentric weights rotates into the positions depicted in FIGS. 4C (t=0.086 s) and 4D (t=0.129 s). Then, as the eccentric weights return to the position depicted in FIG. 4A, another rapid backward movement is generated, again overcoming the frictional forces between the conveyed material and the conveyor trough.

Figure 3A:
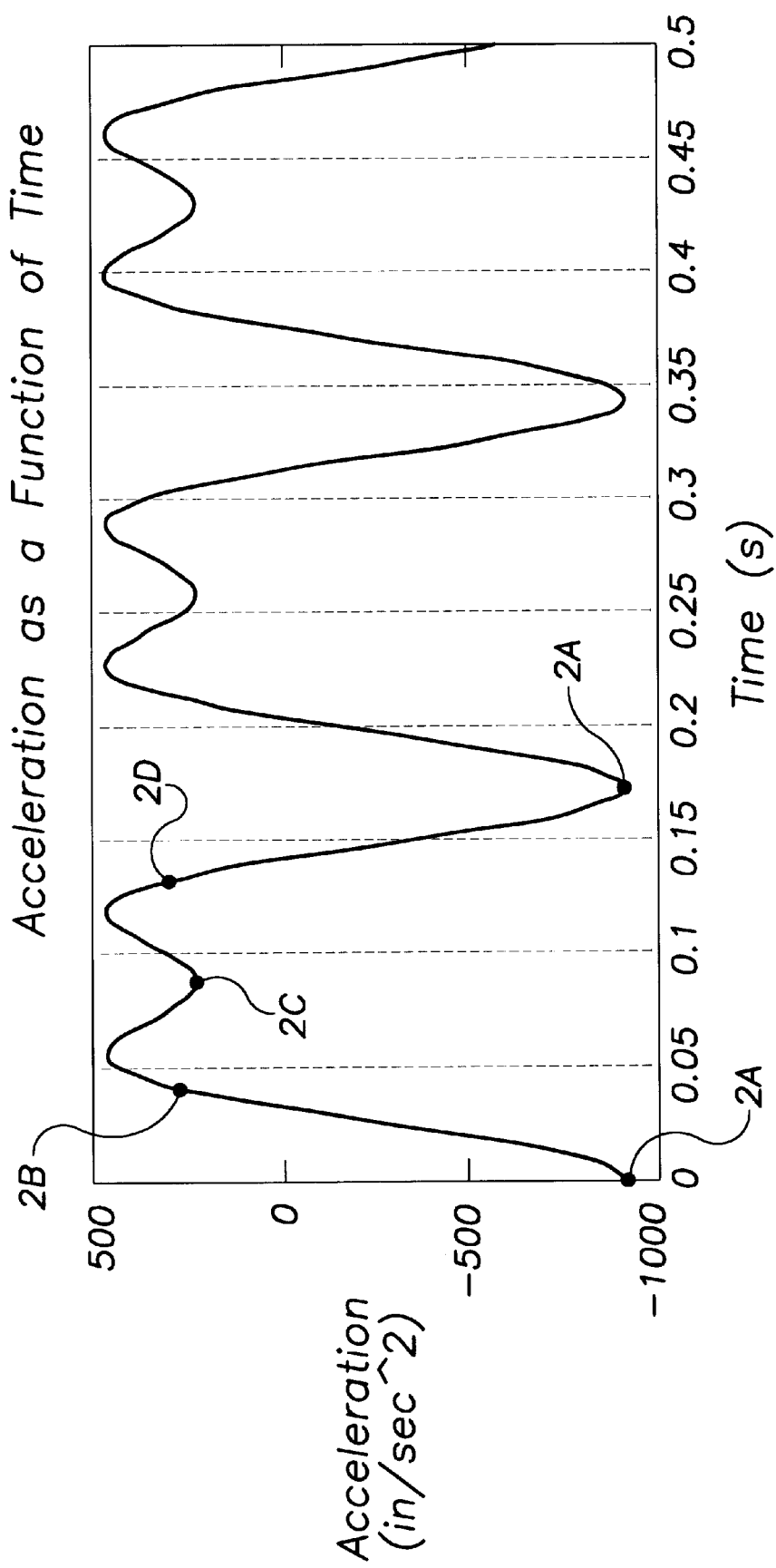
FIG. 3A is a graph representing the net acceleration from the prior art four-shaft differential motion conveyor drive depicted in FIGS. 2A–2D.
Figure 3B:
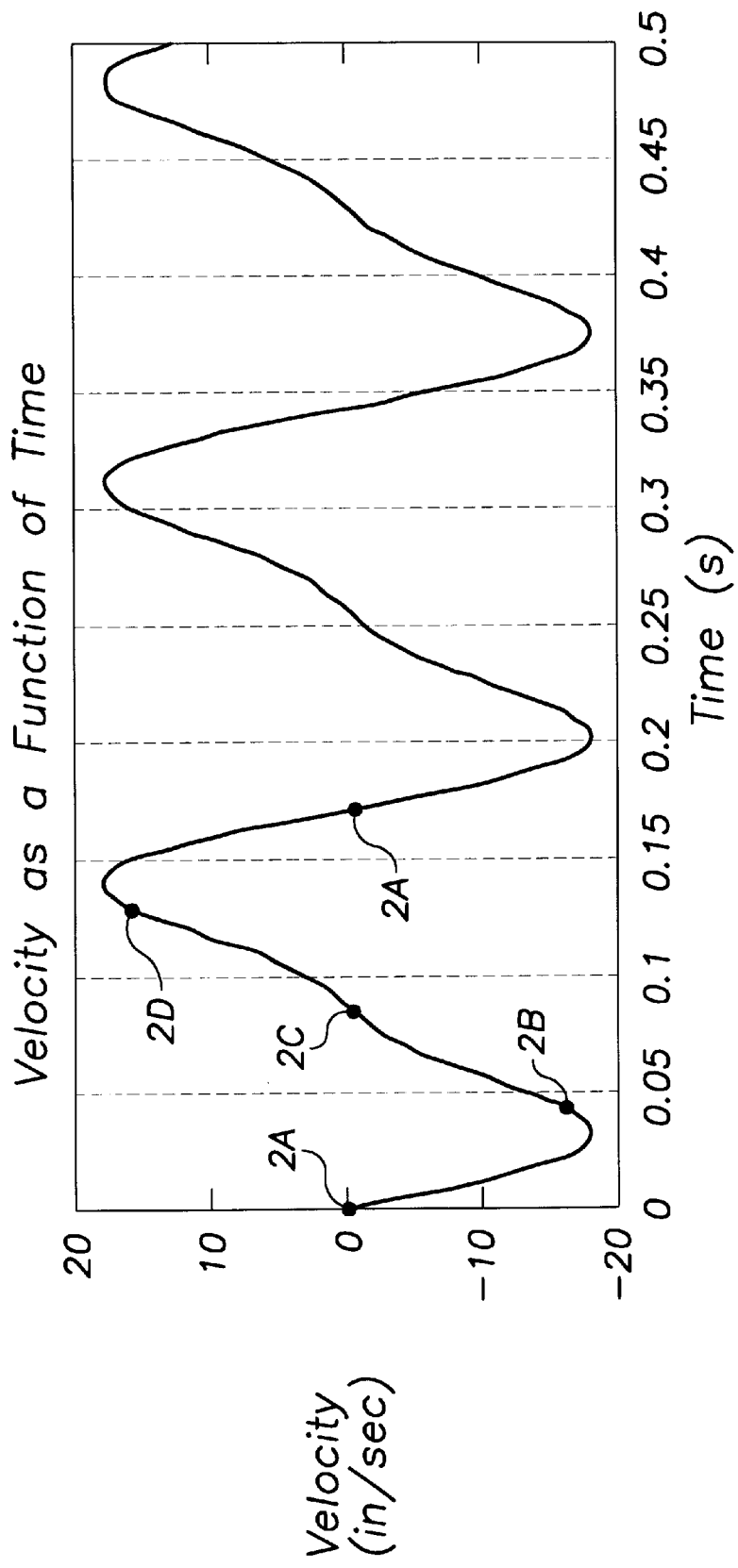
FIG. 3B is a graph representing the velocity of the of the conveying motion as a function of time for the prior art four-shaft differential motion conveyor drive depicted in FIGS. 2A–2D.
Figure 3C:
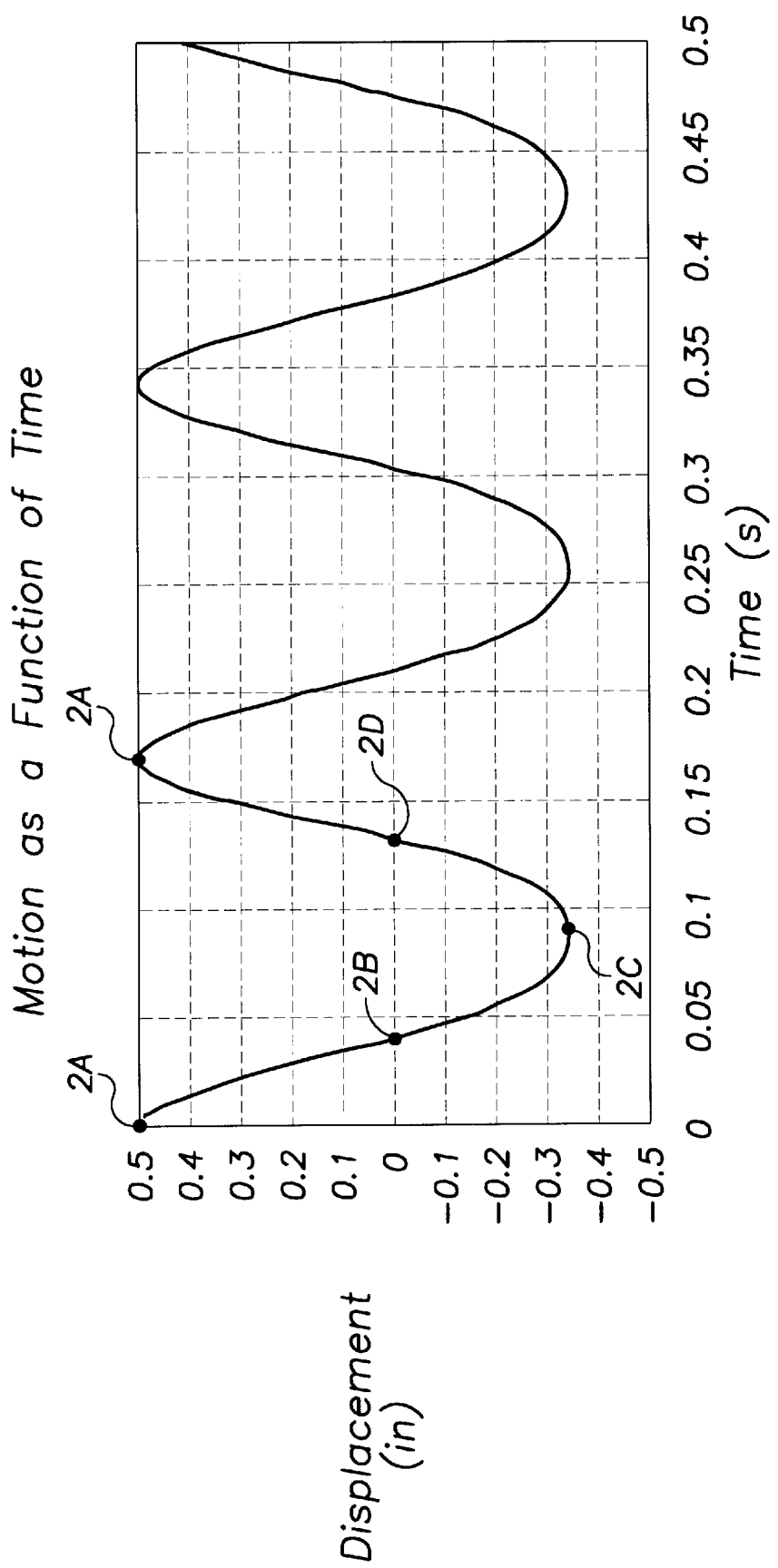
FIG. 3C is a graph representing the displacement of the conveyor trough as a function of time for the prior art four-shaft differential motion conveyor drive depicted in FIGS. 2A–2D.

Referring again to FIG. 5B, the velocity of the conveying motion is graphically depicted as a function of time. Furthermore, as mentioned above, the ideal velocity profile is superimposed in the graph of FIG. 5B and indicated by reference numeral 120. As demonstrated in FIG. 5B (present invention), through selection of the rotational speeds of the drive shaft pairs and the eccentric weights mounted to the drive shaft pairs to approximate the terms of the Fourier series, the velocity profile generated by the six-shaft differential motion conveyor drive of the present invention very closely approximates the ideal velocity profile, especially when compared to the velocity profile generated by a prior art drive (as depicted in FIG. 3B). The velocity profile indicates a substantially constant positive acceleration (i.e., forward movement) with a substantially instantaneous negative acceleration (i.e., backward movement).

Figure 5C:
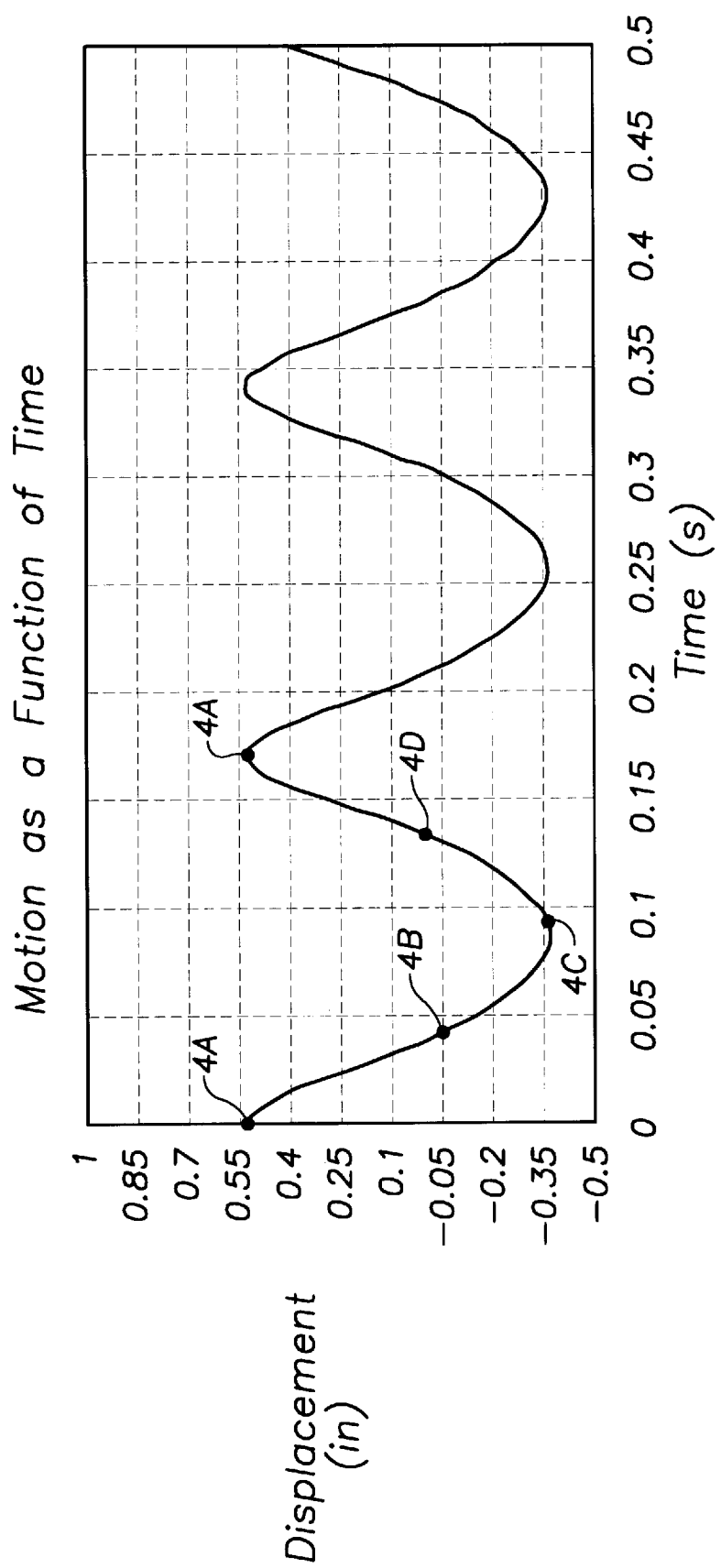
FIG. 5C is a graph representing the displacement of the conveyor trough as a function of time for the six-shaft differential motion conveyor drive depicted in FIGS. 4A–4D.

FIG. 5C depicts the motion (i.e., displacement) of the conveyor trough as a function of time for the six-shaft differential motion conveyor drive of the present invention.

Figure 6:
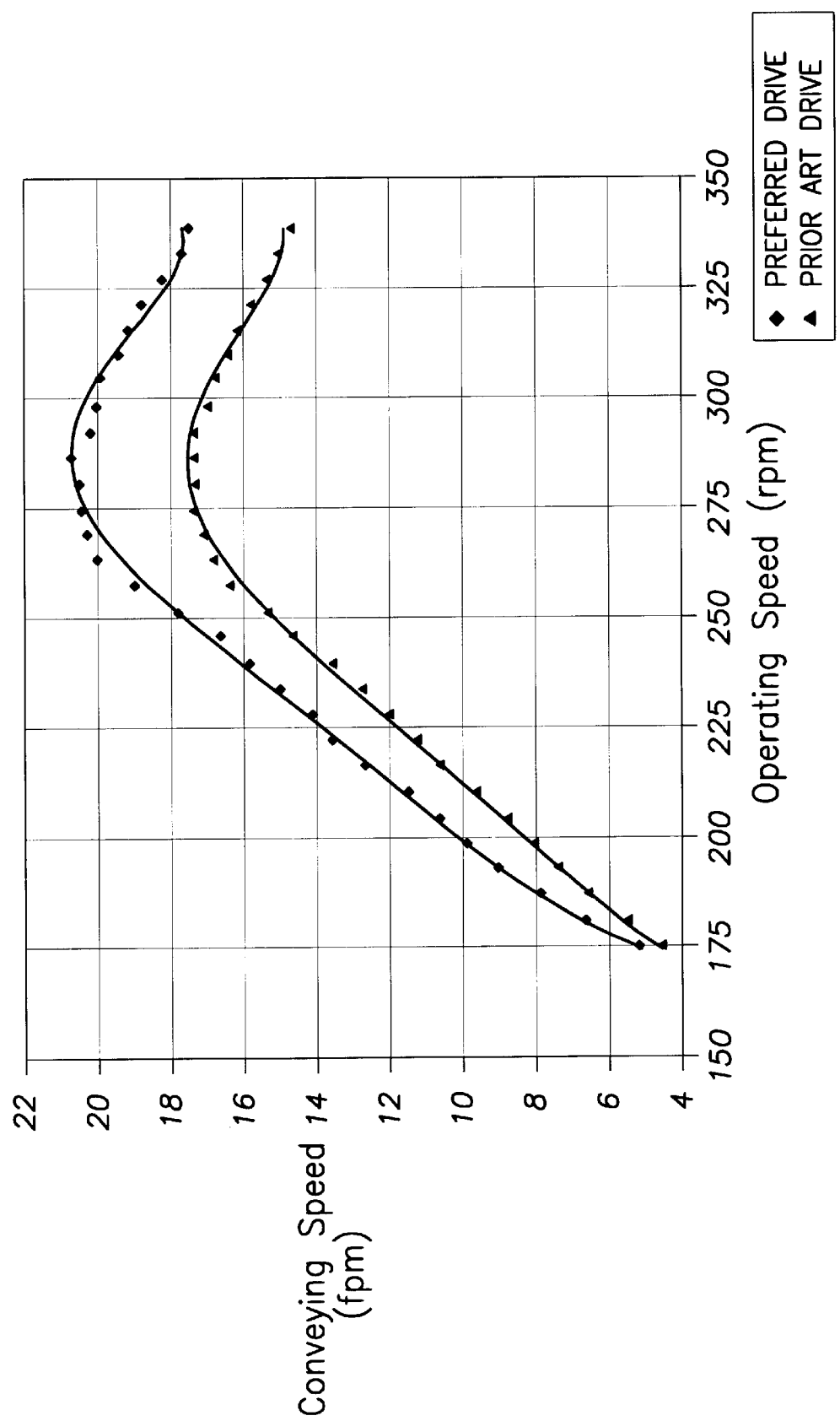
FIG. 6 is a graphical representation of the conveying speed as a function of the operating speed for a differential motion conveyor drive, comparing the speed and efficiency of the six-shaft differential motion conveyor drive of the present invention to that of a prior art drive.

FIG. 6 is a graphical representation of the conveying speed as a function of the operating speed for a differential motion conveyor drive, comparing the speed and efficiency of the six-shaft differential motion conveyor drive of the present invention to that of a prior art drive. The data collected and graphically represented in FIG. 6 resulted from the experimental conveying of castings with the drive operating with a ¾" stroke, the stroke being defined as the maximum displacement less the minimum displacement.

As shown in FIG. 6, throughout the range of operating speeds, from approximately 175 rpm to 340 rpm, the six-shaft differential motion conveyor drive of the present invention consistently produced a higher conveying speed compared to that produced by a prior art drive.

Figure 7:
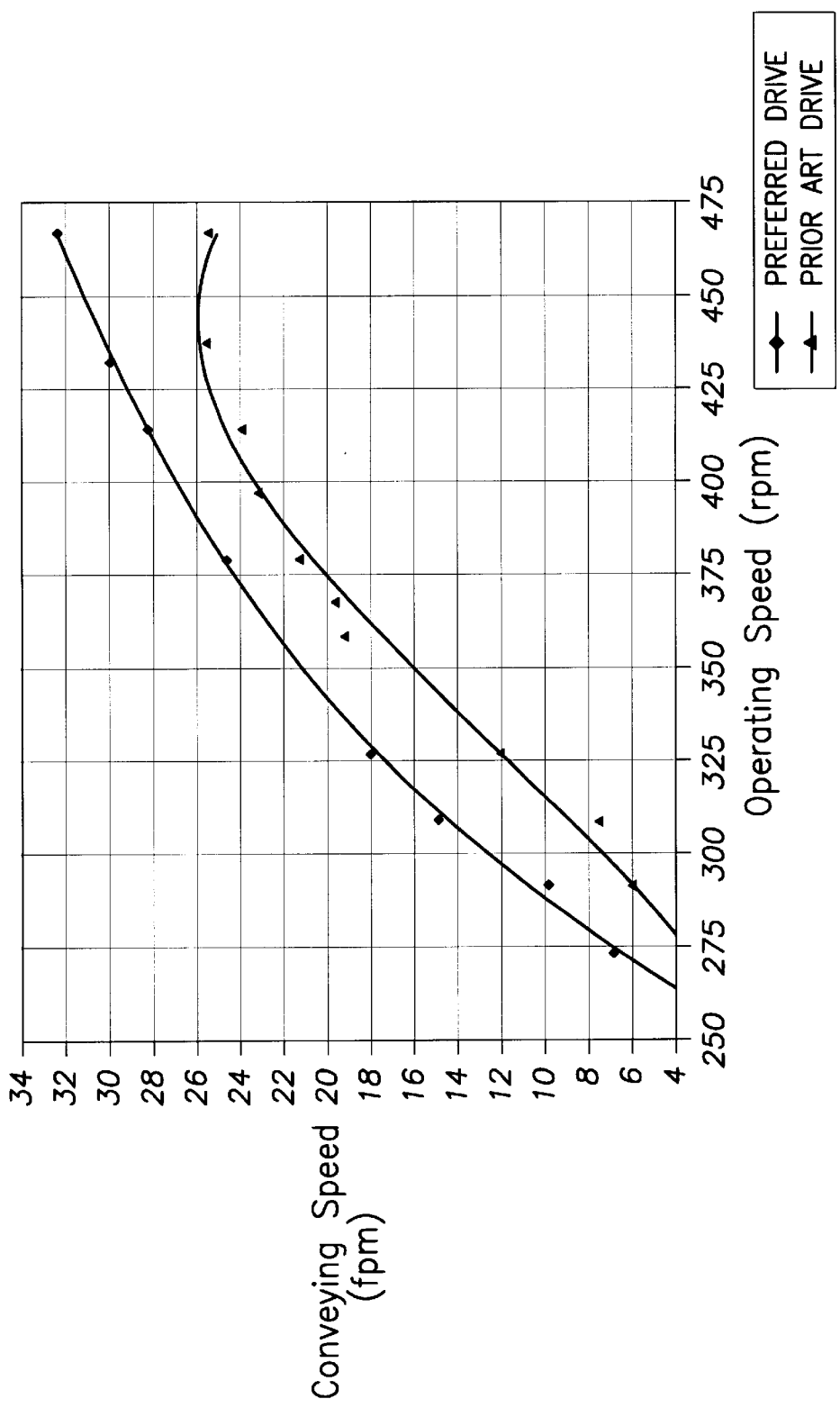
FIG. 7 is another graphical representation of the conveying speed as a function of the operating speed for a differential motion conveyor drive, comparing the speed and efficiency of the six-shaft differential motion conveyor drive of the present invention to that of a prior art drive.

FIG. 7 is another graphical representation of the conveying speed as a function of the operating speed for a differential motion conveyor drive, again comparing the speed and efficiency of the six-shaft differential motion conveyor drive of the present invention to that of a prior art drive. In this example, the data collected and graphically represented resulted from the experimental conveying of castings with the drive operating with a 11/16" stroke.

Again, throughout the range of operating speeds, from approximately 275 rpm to 465 rpm, the six-shaft differential motion conveyor drive of the present invention consistently produced a higher conveying speed compared to that produced by the prior art drive.

The improvement in conveying speed graphically demonstrated in FIGS. 6 and 7 is very significant. One the primary initial costs in the construction of a differential motion conveyor drive is the cost of bearings for each of the shafts. Furthermore, maintenance of the bearings is a significant continuing operational cost, and the end user wants to maximize bearing life to minimize maintenance and replacement costs. If greater conveying speeds can be achieved without a concomitant increase in operating speed, wear on the bearings is significantly reduced, effectively extending the life of the bearings and reducing the operational costs.

Figure 8:
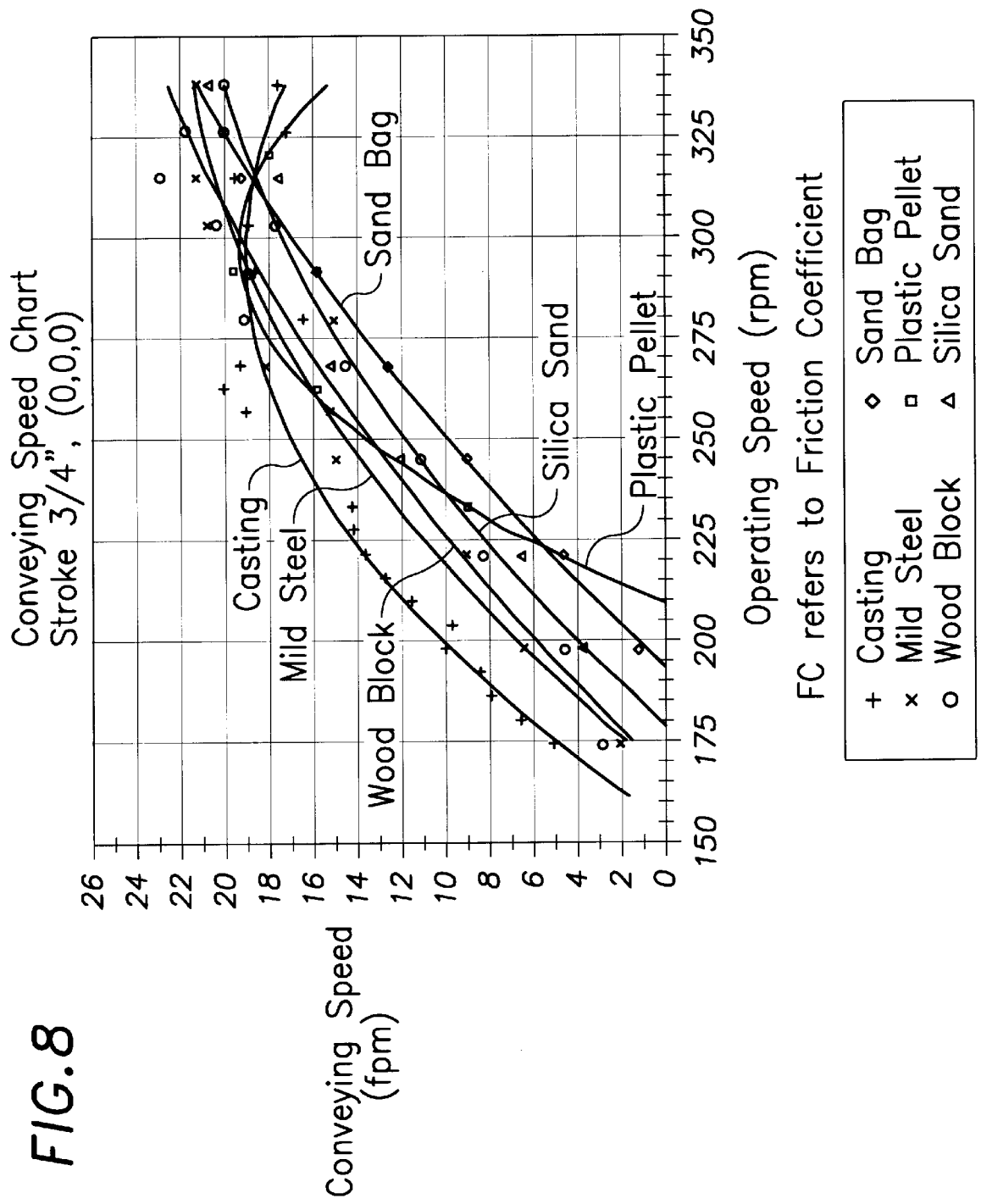
FIG. 8 is another graphical representation of the conveying speed as a function of the operating speed for a differential motion conveyor drive to experimentally demonstrate the effectiveness of the conveyor drive of the present invention in conveying different products.
Figure 9A:
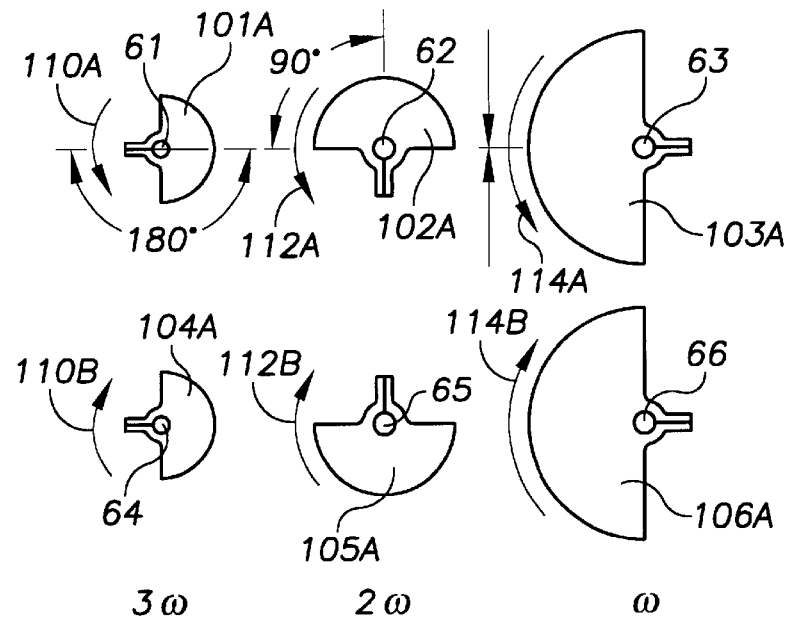
FIGS. 9A–9D depict the relative positions of the eccentric weights mounted to the six drive shafts of an alternate preferred differential motion conveyor drive in accordance with the present invention through one conveying cycle.
Figure 9B:
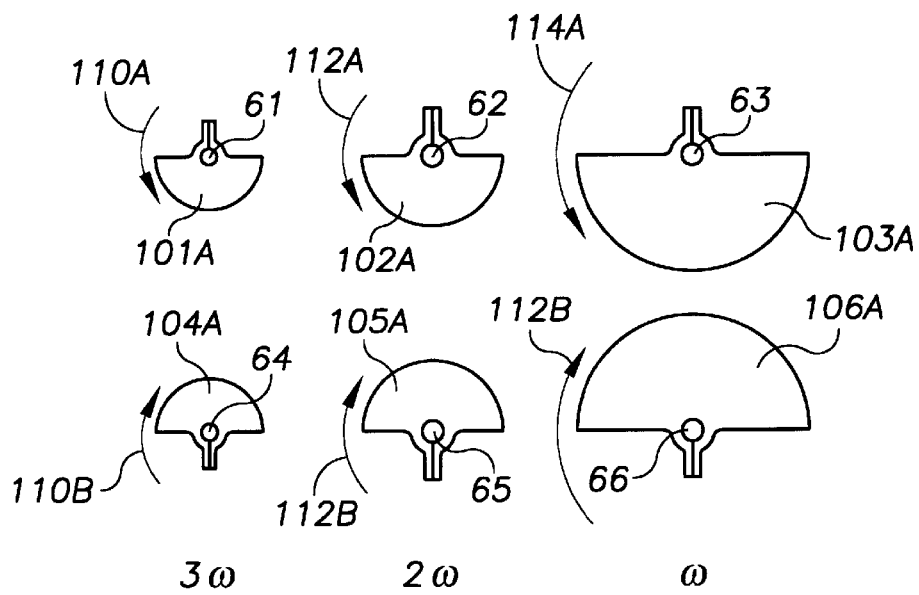
Figure 9C:
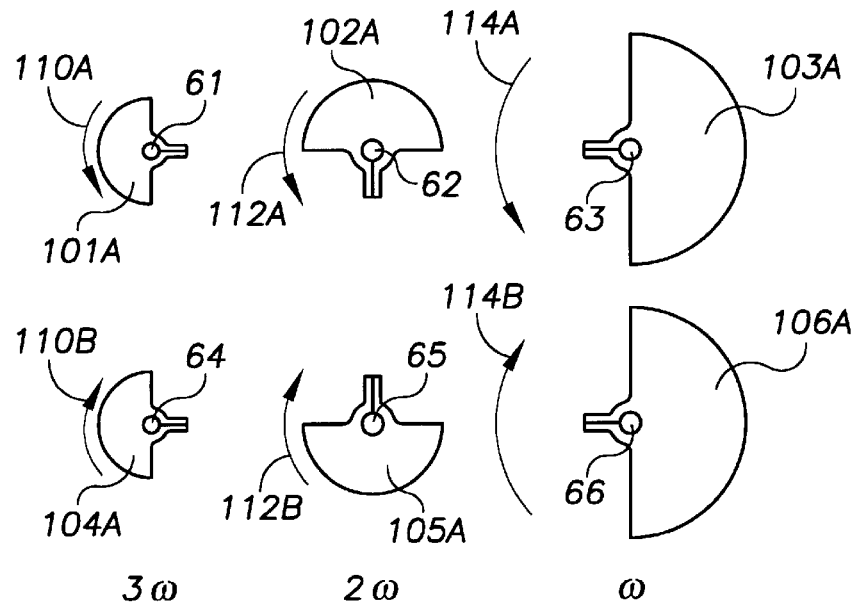
Figure 9D:
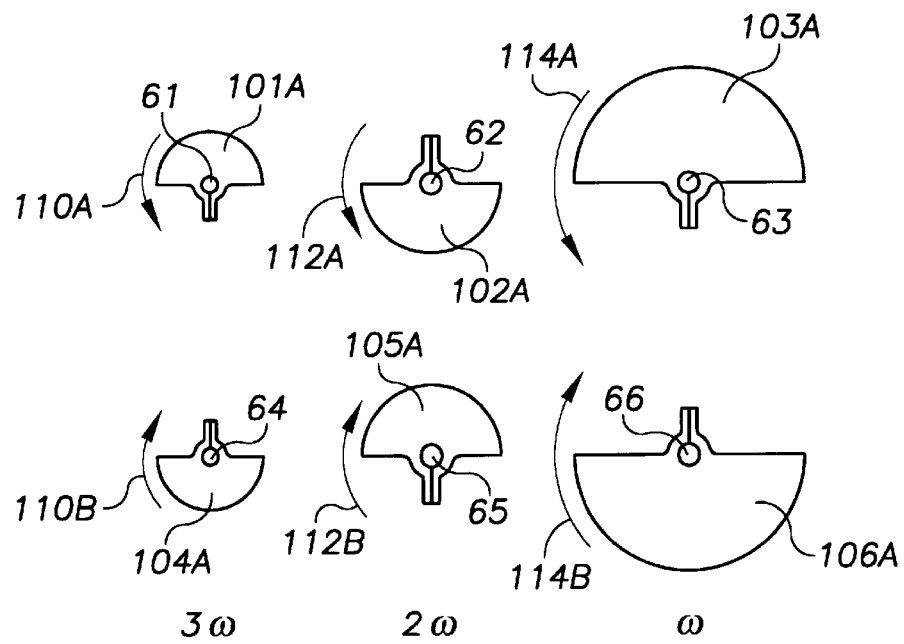

FIG. 8 is another graphical representation of the conveying speed as a function of the operating speed for a differential motion conveyor drive to demonstrate the experimental effectiveness of the conveyor drive of the present invention for conveying various materials, including: castings, mild steel, wood blocks, sand bags, plastic pellets, and silica sand. As indicated, the data collected and graphically represented resulted from experimental conveying with the drive operating with a ¾" stroke.

FIGS. 9A–9D depict the relative positions of the eccentric weights mounted to the six drive shafts 61, 62, 63, 64, 65, 66 of an alternate preferred differential motion conveyor drive in accordance with the present invention during the conveying cycle. Specifically, in this alternate embodiment, the phase angles between the respective eccentric weights have been altered. With the eccentric weights 103A and 106A of shafts 63 and 66 serving as a reference, eccentric weights 102A and 105A of shafts 62 and 65 are out of phase by −90°, and eccentric weights 101A and 104A of shafts 61 and 64 are out of phase by 180°. In this arrangement, through experimental study, it has been determined that a preferred weight distribution would include each of the shafts 63 and 66 carrying a weight WR, each of the shafts 62 and 65 carrying a weight (0.33)WR, and each of shafts 61 and 64 carrying a weight (0.10)WR. In this case, the resulting displacement approximates the Fourier series of equation (1). This arrangement is preferred for higher conveying speeds and also allows for a reverse conveying action when the direction of the motor rotation is reversed.

Figure 10:
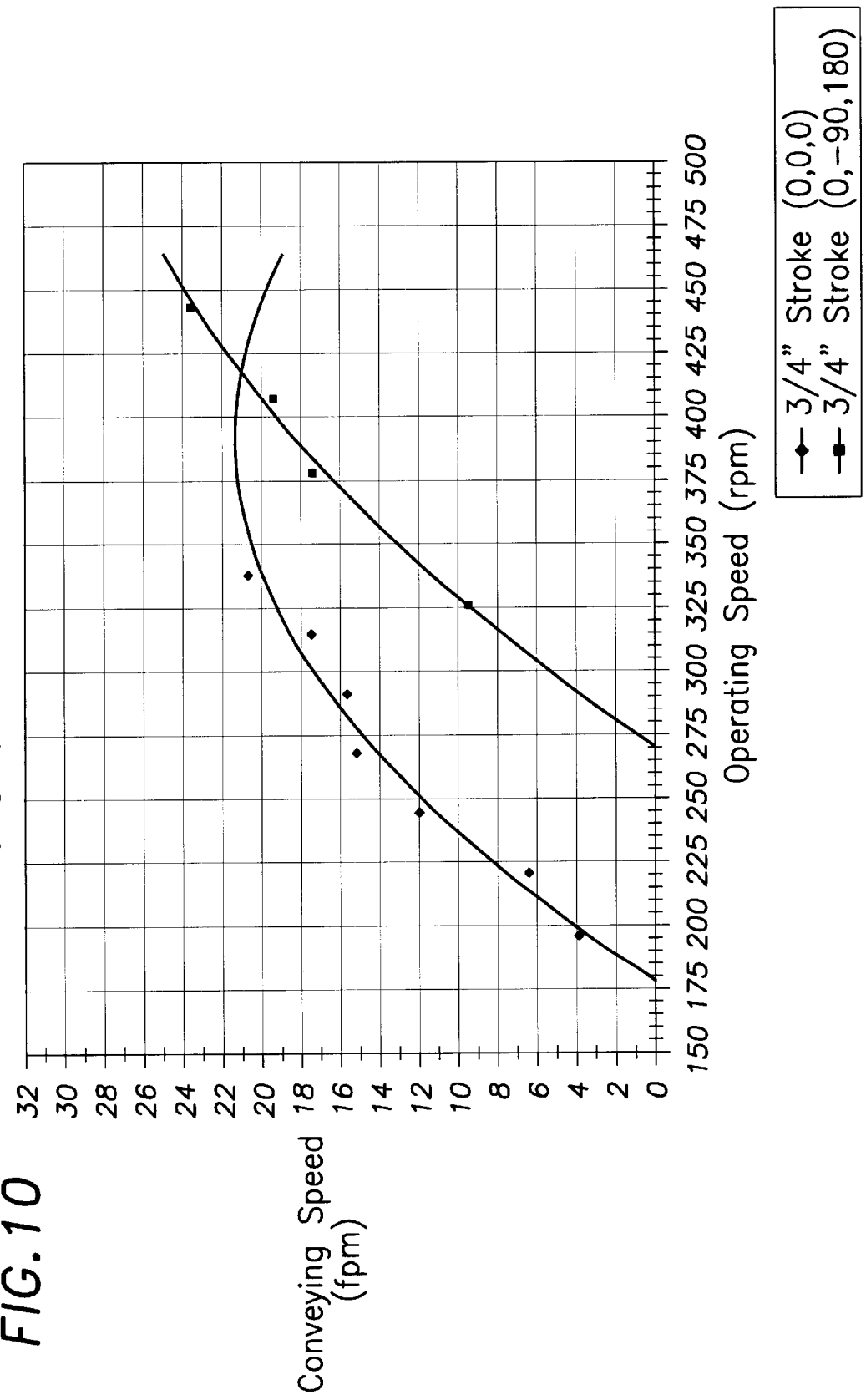
FIG. 10 is a graphical representation of the conveying speed as a function of the operating speed for a differential motion conveyor drive, comparing the speed and efficiency of a six-shaft differential motion conveyor drive of the present invention with a (0, 0, 0) phase relationship, as shown in FIGS. 4A–4D, and a drive with a (0, –90, 180) phase relationship, as shown in FIGS. 9A–9D.

FIG. 10 is a graphical representation of the conveying speed as a function of the operating speed for a differential motion conveyor drive, comparing the speed and efficiency of two six-shaft differential motion conveyor drives in accordance with the present invention, one with a (0, 0, 0) phase relationship and one with a (0, −90, 180) phase relationship. The data collected and graphically represented in FIG. 10 resulted from the experimental conveying of silica sand with the drive operating with a ¾" stroke. As shown, the conveyor drive with a (0, 0, 0) phase relationship can achieve a conveying speed up to approximately 21 fpm with a much lower operating speed than is required by the conveyor drive with a (0, −90, 180) phase relationship. However, the maximum conveying speed for the conveyor drive with a (0, 0, 0) phase relationship is approximately 21 fpm. The conveyor drive with a (0, −90, 180) phase relationship can significantly exceed that conveying speed, confirming its appropriateness when high conveying speeds are required. As mentioned above, the conveyor drive with a (0, −90, 180) phase relationship also allows for a reverse conveying action when the direction of the motor rotation is reversed.

Figure 11:
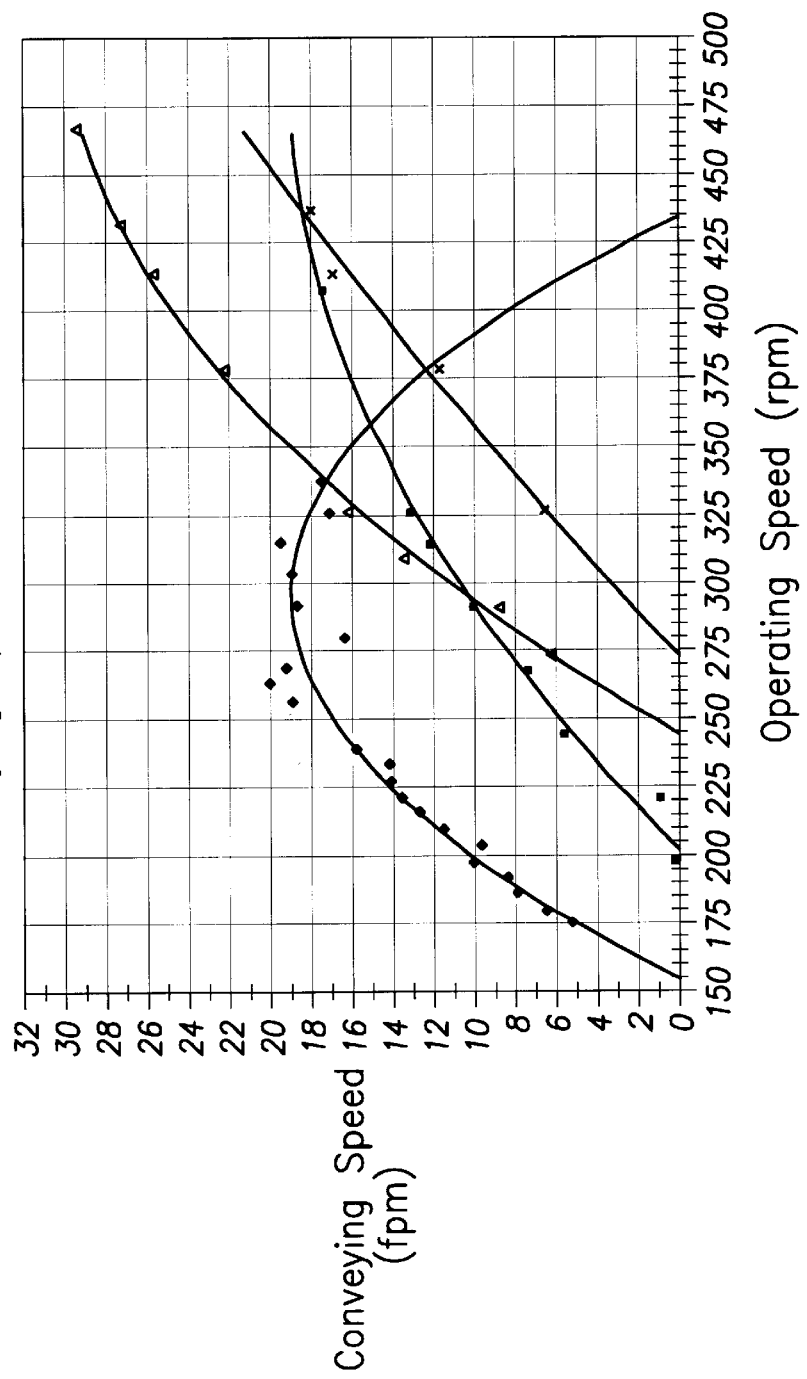
FIG. 11 is another graphical representation of the conveying speed as a function of the operating speed for a differential motion conveyor drive, comparing the speed and efficiency of a six-shaft differential motion conveyor drive of the present invention with a (0, 0, 0) phase relationship and a drive with a (0, −90, 180) phase relationship.

FIG. 11 is another graphical representation of the conveying speed as a function of the operating speed for a differential motion conveyor drive, comparing the speed and efficiency of two six-shaft differential motion conveyor drives in accordance with the present invention, one with a (0, 0, 0) phase relationship and one with a (0, −90, 180) phase relationship. The data collected and graphically represented in FIG. 10 resulted from the experimental conveying of castings with the drive operating with at a ¾" stroke and a ½" stroke.

With respect to the ¾" stroke, the conveyor drive with a (0, 0, 0) phase relationship can achieve a conveying speed up to approximately 19 fpm with a much lower operating speed than is required by the conveyor drive with a (0, −90, 180) phase relationship. However, the maximum conveying speed for the conveyor drive with a (0, 0, 0) phase relationship is approximately 19 fpm, whereas the conveyor drive with a (0, −90, 180) phase relationship can achieve a conveying speed as high as 29 fpm.

Similarly, with respect to the ½" stroke, the conveyor drive with a (0, 0, 0) phase relationship can achieve a conveying speed up to approximately 18 fpm with a much lower operating speed than is required by the conveyor drive with a (0, −90, 180) phase relationship. However, the maximum conveying speed for the conveyor drive with a (0, 0, 0) phase relationship is approximately 19 fpm, whereas the conveyor drive with a (0, −90, 180) phase relationship can achieve a significantly greater conveying speed.

Figure 12:
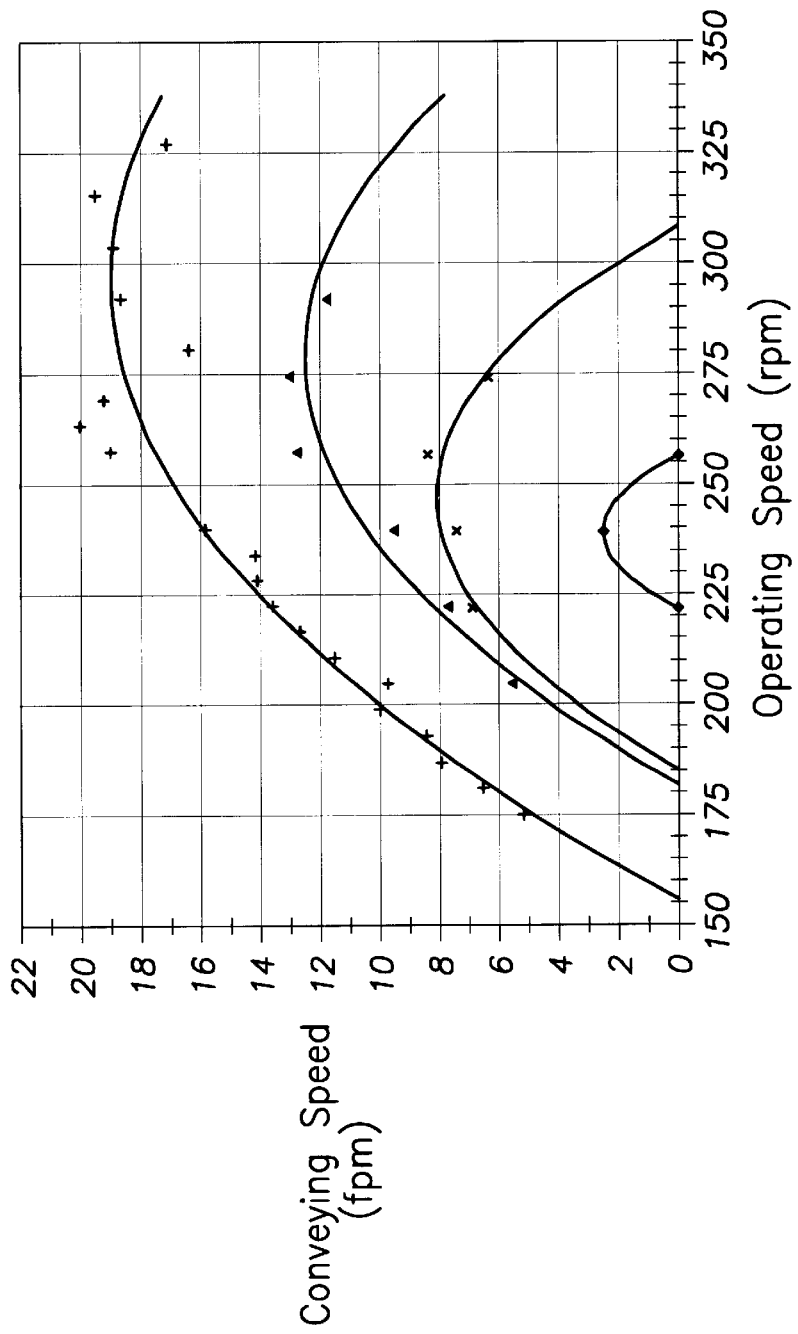
FIG. 12 is another graphical representation of the conveying speed as a function of the operating speed for a differential motion conveyor drive with a (0, 0, 0) phase relationship to demonstrate the experimental effectiveness of the conveyor drive for conveying castings along an incline.

FIG. 12 is another graphical representation of the conveying speed as a function of the operating speed for a differential motion conveyor drive with a (0, 0, 0) phase relationship to demonstrate the experimental effectiveness of the conveyor drive for conveying castings along an incline. As indicated, the data collected and graphically represented resulted from experimental conveying with the drive operating with a ¾" stroke.

Throughout the above description of the preferred embodiments of the present invention, the differential motion conveyor drive employs six drive shafts. As mentioned above, a Fourier series contains an infinite number of sinusoidal terms. Thus, to include all of the terms of the Fourier series would require an infinite number of shafts. Of course, this is impossible. As the experimental data contained herein demonstrates, by using at least six drive shafts, the ideal velocity profile represented by the Fourier series of equation (2) above can be closely approximated. Within the bounds of practical considerations, however, additional pairs of shafts and appropriate eccentric weights (representing additional terms of a Fourier series) could certainly be incorporated into the differential motion conveyor drive of the present invention without departing from the spirit and scope of the present invention.

It will be obvious to those skilled in the art that further modifications may be made to the embodiments described herein without departing from the spirit and scope of the present invention.

What is claimed is:

1. A differential motion conveyor drive for imparting a substantially horizontal force to a material-conveying trough, comprising:

a frame secured to said material-conveying trough;

at least six drive shafts mounted for rotation relative to said frame, said drive shafts being arranged in pairs, and each pair of drive shafts carrying weights comprised of one or more eccentric weight elements;

a plurality of drive pulleys, each such drive pulley associated with and operably secured to one of said drive shafts;

a motor secured to said frame and including a shaft with a drive pulley operably secured to the distal end thereof; and a belt extending around and operably connecting the plurality of drive pulleys associated with said drive shafts and the drive pulley associated with the motor;

wherein the rotation of motor, its shaft and associated drive pulley results in the simultaneous rotation of said at least six drive shafts and the weights carried by said drive shafts to impart the substantially horizontal force to the material-conveying trough;

wherein the belt is routed in a specific pattern such that each pair of drive shafts rotates at a predetermined rotational speed; and wherein the rotational speed of each pair of drive shafts and the weights carried by each pair of drive shafts are selected to approximate the terms of a Fourier series.

2. A differential motion conveyor drive as recited in claim 1, in which said first pair of shafts counter-rotate at a predetermined operating speed ω, said second pair of shafts counter-rotate rotate at an operating speed 2ω, and said third pair of shafts counter-rotate at an operating speed 3ω.

3. A differential motion conveyor drive as recited in claim 2, in which the respective weights carried by the first, second, and third pairs of drive shafts are WR, essentially (0.50)WR, and essentially (0.33)WR.

4. A differential motion conveyor drive as recited in claim 2, in which the respective weights carried by the first, second, and third pairs of drive shafts are WR, essentially (0.18)WR, and essentially (0.05)WR.

5. A differential motion conveyor drive as recited in claim 1, wherein the weights carried by said second pair of drive shafts are out of phase by −90° with respect to the weights of said first pair of drive shafts, and wherein the weights carried by said third pair of drive shafts are out of phase by 180° with respect to the weights of said first pair of drive shafts.

6. A differential motion conveyor drive as recited in claim 5, in which the respective weights carried by the three pairs of drive shafts are WR, essentially (0.33)WR, and essentially (0.10)WR.

7. A differential motion conveyor drive as recited in claim 1, wherein the weights carried by the respective drive shafts are mounted so as to produce equal but opposite vertical force components that cancel one another throughout the rotation of said drive shafts.

8. A differential motion vibratory conveyor having a trough for carrying material, comprising:

at least three pairs of counter-rotating shafts mounted to a frame and extending substantially perpendicular to a direction of movement of the material carried by said trough, each of said shaft pairs carrying eccentric weights, the eccentric weight carried by each shaft of a respective shaft pair being essentially the same magnitude as the eccentric weight of the other shaft of the shaft pair, such that the forces imparted to the trough by the rotating eccentric weights are substantially horizontal, said first, second, and third shaft pairs being rotated respectively at speeds of essentially ω, 2ω, and 3ω, and the associated eccentric weights of each of said shafts pairs selected to approximate the first several terms of a Fourier series, $$f(x) = \left(\frac{\sin x}{1} - \frac{\sin 2x}{2} + \frac{\sin 3x}{3} - \cdots\right).$$

9. A differential motion vibratory conveyor as recited in claim 8, in which the respective eccentric weights carried by the three pairs of shafts are WR, essentially (0.50)WR, and essentially (0.33)WR.

10. A differential motion vibratory conveyor as recited in claim 8, in which the respective eccentric weights carried by the three pairs of shafts are WR, essentially (0.18)WR, and essentially (0.05)WR.

11. A differential motion conveyor drive as recited in claim 8, wherein the eccentric weights carried by said second pair of shafts are out of phase by −90° with respect to the eccentric weights of said first pair of shafts, and wherein the eccentric weights carried by said third pair of shafts are out of phase by 180° with respect to the eccentric weights of said first pair of shafts.

12. A differential motion conveyor drive as recited in claim 11, in which the respective eccentric weights carried by the three pairs of drive shafts are WR, essentially (0.33)WR, and essentially (0.10)WR.

13. A method of maximizing conveying speed in a differential motion vibratory conveyor having a trough carrying material by approximating a Fourier series, $$f(x) = \left(\frac{\sin x}{1} - \frac{\sin 2x}{2} + \frac{\sin 3x}{3} - \cdots\right),$$

representing an idealized velocity profile during a complete cycle in which the trough is provided with a slower forward velocity as a portion of the complete cycle, and a faster return velocity as the remainder of the complete cycle, comprising the steps of:

(a) providing the conveyor with at least three pairs of counter-rotating shafts extending essentially perpendicular to a direction of conveyance, each of said shaft pairs carrying eccentric weights, the eccentric weight carried by each shaft of a respective shaft pair being essentially the same magnitude as the eccentric weight of the other shaft of the shaft pair, such that the forces imparted to the trough by the rotating eccentric weights are substantially horizontal; and (b) arranging the first, second, and third shaft pairs to rotate at predetermined speed and the associated eccentric weights of the first, second, and third shaft pairs having magnitudes essentially approximating respective first, second, and third terms of the Fourier series.

14. A method as recited in claim 13, in which said first pair of shafts counter-rotate at a predetermined operating speed ω, said second pair of shafts counter-rotate at an operating speed 2ω, and said third pair of shafts counter-rotate at an operating speed 3ω.

15. A method as recited in claim 14, in which the respective weights carried by the three pairs of shafts are WR, essentially (0.50)WR, and essentially (0.33)WR.

16. A method as recited in claim 14, in which the respective weights carried by the three pairs of shafts are WR, essentially (0.18)WR, and essentially (0.05)WR.

17. A method as recited in claim 13, wherein the weights carried by said second pair of shafts are out of phase by −90° with respect to the weights of said first pair of shafts, and wherein the weights carried by said third pair of shafts are out of phase by 180° with respect to the weights of said first pair of shafts.

18. A method as recited in claim 16, in which the respective weights carried by the three pairs of shafts are WR, essentially (0.33)WR, and essentially (0.10)WR.

\* \* \* \* \*